(12) United States Patent
Schmitz

(10) Patent No.: US 11,220,225 B2
(45) Date of Patent: Jan. 11, 2022

(54) INTERIOR TRIM PART

(71) Applicant: Dr. Ing. h.c. F. Porsche Aktiengesellschaft, Stuttgart (DE)

(72) Inventor: Stefan Schmitz, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 130 days.

(21) Appl. No.: 16/775,853

(22) Filed: Jan. 29, 2020

(65) Prior Publication Data

US 2020/0247332 A1 Aug. 6, 2020

(30) Foreign Application Priority Data

Feb. 5, 2019 (DE) ..................... 10 2019 102 750.0

(51) Int. Cl.
*B60R 13/02* (2006.01)
*B60R 13/08* (2006.01)

(52) U.S. Cl.
CPC .......... *B60R 13/0206* (2013.01); *B60R 13/08* (2013.01)

(58) Field of Classification Search
CPC ............................ B60R 13/0206; B60R 13/08
See application file for complete search history.

(56) References Cited

U.S. PATENT DOCUMENTS

| | | | |
|---|---|---|---|
| 3,431,014 | A | 3/1969 | Fritsch |
| 6,089,349 | A | 7/2000 | Aye |
| 6,251,498 | B1 | 6/2001 | Fukushima et al. |

FOREIGN PATENT DOCUMENTS

| | | |
|---|---|---|
| DE | 1 935 864 | 3/1966 |
| DE | 40 33 804 | 4/1992 |
| DE | 94 11 702 | 9/1994 |
| DE | 694 04 585 | 1/1998 |
| DE | 697 07 593 | 6/2002 |
| DE | 699 10 175 | 6/2004 |
| DE | 10 2005 048 069 | 4/2007 |
| EP | 2 210 781 | 7/2010 |
| JP | 2003-252125 | 9/2003 |
| JP | 2018-079809 | 5/2018 |

OTHER PUBLICATIONS

German Examination Report dated Nov. 6, 2019.
Japanese Office Action dated Dec. 23, 2020.
Great Britain Combined Search and Examination Report dated Jul. 31, 2020.

*Primary Examiner* — D Glenn Dayoan
*Assistant Examiner* — Melissa Ann Bonifazi
(74) *Attorney, Agent, or Firm* — Gerald E. Hespos; Michael J. Porco; Matthew T. Hespos

(57) ABSTRACT

An interior trim part (10) for cladding an inner side of a motor vehicle body has a cladding panel (12) forming an inner surface (14) and delimiting a passenger compartment. A flexible insulation layer (18) is fastened to a rear surface (16) of the cladding panel (12) that points away from the inner surface (14). The cladding panel (12) has a protruding fastening element (22) projecting through an opening (20) of the insulation layer (18). The fastening element (22) has a lateral receiving opening (28) and the insulation layer (18) has a retaining strip (32) unconnected to the rear surface (16). The retaining strip (32) is inserted into the receiving opening (28). A situation in which the fastening element (22) is covered by the extended insulation layer (18) is avoided by the retaining strip (32) inserted in the lateral receiving opening (28).

11 Claims, 4 Drawing Sheets

INTERIOR TRIM PART

CROSS REFERENCE TO RELATED APPLICATION

This application claims priority under 35 USC 119 to German Patent Appl. No. 10 2019 102 750.0 filed on Feb. 5, 2019, the entire disclosure of which is incorporated herein by reference.

BACKGROUND

Field of the Invention

The invention relates to an interior trim part, by means of which an inner side of a motor vehicle body can be cladded.

Related Art

A previously known interior trim part 10 shown in FIG. 1 has a cladding panel 12, an inner surface 14 of which points towards a passenger compartment of a motor vehicle. A soft and pliable insulation layer 18 is fastened to a rear surface 16 that points away from the inner surface 14. The insulation layer 18 has an opening 20, through which a fastening element 22 protruding from the rear surface 16 can project. The fastening element 22 forms, at a distance from the insulation layer 18 and at its face side 24, a fastening means 26, for example designed as a hook, by means of which the interior trim part 10 can be fastened to a motor vehicle body.

There is a constant demand to simplify the installation of interior trim parts.

It is an object of the invention to facilitate installation of an interior trim part.

SUMMARY

An interior trim part for cladding an inner side of a motor vehicle body has a cladding panel for forming an inner surface that delimits a passenger compartment. A flexible insulation layer is fastened to a rear surface of the cladding panel. The rear surface faces away from the inner surface. The cladding panel has a protruding fastening element that projects through an opening of the insulation layer. The fastening element has a lateral receiving opening and the insulation layer has a retaining strip that is not connected to the rear surface. The retaining strip is inserted into the receiving opening for pressing the insulation layer against the rear surface of the cladding panel.

The retaining strip is inserted in the lateral receiving opening to secure the insulation layer in position and to block a movement of the insulation layer along the fastening element. More particularly, when the interior trim part is aligned on the motor vehicle body, the interior trim part can be pushed along on the motor vehicle body and a part of the flexible insulation layer can be pulled over the fastening element in the process due to the shear forces acting during the displacement. To keep the structural space requirement as low as possible, the fastening element generally projects only as far out of the insulation layer as is imperatively necessary. Thus, the protruding length of the fastening element from the insulation layer can be smaller than the maximum possible change in length of the extended insulation layer. The extended insulation layer pulled over the fastening element can cover a fastening means formed on the fastening element and can impede fastening of the interior trim part to the inner side of the motor vehicle body. However, the remainder of the insulation layer can be held back by the retaining strip. Therefore, the insulation layer, even in the extended state, at most bears against the retaining strip, but cannot be pulled over the face side of the fastening element. The retaining strip is received in the lateral receiving opening, which is at an adequate distance from the face side of the fastening element and/or from a fastening means formed by the fastening element, and thereby cannot be extended sufficiently to impair the fastening of the interior trim part to the inner side of the motor vehicle body. In particular, an increased material thickness (i.e. a double the material thickness) of the insulation layer is formed by the retaining strip, such that the insulation layer is compressed strongly in the region of the retaining strip when the interior trim part is applied to the inner side of the motor vehicle body. Accordingly, the ability of the insulation layer to expand is reduced by the increased compression of the insulation layer in this region, such that a region of the fastening element that is crucial for the fastening will not be covered. If a region of the fastening element that is crucial for the fastening is provided on a side surface of the fastening element rather than on the face side, then the retaining strip and the lateral receiving opening can be provided on the same side surface. Thus, the retaining strip that is inserted in the lateral receiving opening avoids a situation in which the fastening element is covered by extension of the insulation layer. Hence, installation of the interior trim part is easy.

At least portions of the retaining strip are bent out, for example elastically, from a plane of the insulation layer. The retaining strip is bent out from a plane extending and/or following in direct proximity to the fastening element. The retaining strip does not have to be provided as a separate component and does not have to protrude from the insulation layer. Instead, it is possible to allow the retaining strip to protrude laterally from the rest of the insulation layer or deliberately not to fasten a subregion of the insulation layer to the cladding panel. Since the retaining strip is not fastened to the cladding panel, the retaining strip can be bent by approx. 180° out from the plane of the insulation layer and the free end of the bent retaining strip can be inserted into the lateral receiving opening of the fastening element. Since the retaining strip, as part of the insulation layer, is connected at its other end to the rest of the insulation layer, the retaining strip already is deformed significantly and can thereby be flexurally stiffer than the rest of the insulation layer. The blocking action of the retaining strip can thereby be improved, without increasing the number of components.

The insulation layer may have a restoring capacity, for example an elastic, restoring capacity, and/or may be compressible. The insulation layer can thereby provide a spring force when the insulation layer is pressed, compressed and/or bent. This makes it possible for the insulation layer to be able to yield somewhat when the interior trim part is aligned on the motor vehicle body. At the same time, that part of the insulation layer that forms the retaining strip can block and/or possibly elastically hold back the remainder of the insulation layer, so that the insulation layer is not pulled over the fastening element. It is even possible for the retaining strip that is inserted in the receiving opening to bear with a spring force against the rest of the insulation layer and for the insulation layer to press against the rear surface of the cladding panel.

The receiving opening of one embodiment has a retaining edge that faces towards the rear surface so that the retaining strip bears against the retaining edge. Thus, the retaining strip ensures that material of the insulation layer that surrounds the opening of the insulation layer will not move away from the rear surface and without the retaining strip being pressed away from the insulation layer. The bent retaining strip can bear against the retaining edge that is provided farther away from the cladding panel with a spring force and forms a blockage that holds back the extended insulation layer. The retaining strip also can be pressed and/or elastically compressed by the extended insulation layer against the retaining edge so that the retaining strip stiffens and holds back the extended insulation layer.

The receiving opening may have an inner edge that faces away from the rear surface and that is recessed in the material of the insulation layer. The retaining strip that has been inserted in the receiving opening can contact the insulation layer outside the opening. The retaining strip thus can be positioned in proximity to the rest of the insulation layer such that the retaining strip already makes contact with the rest of the insulation layer. A movement of the insulation layer along the fastening element when the insulation layer is extended can thereby be minimized.

The fastening element of one embodiment has a further receiving opening that is opposite the first receiving opening, and the two receiving openings may be substantially identical. The retaining strip can be pushed through both receiving openings so that the retaining strip enters the first receiving opening and exits the second receiving opening. The retaining strip can thereby hold back the rest of the insulation layer on two mutually opposite side surfaces of the fastening element.

The retaining strip can be produced by punching-out or cutting-out the material of the insulation layer so that the retaining strip is a constituent part of the outline of the insulation layer. The retaining strip can thereby be created cost-effectively. At the same time, the entire insulation layer except for the retaining strip can be connected to the rear surface of the cladding panel, for example by an adhesive layer, such that the retaining strip can simply be bent out from the plane of the insulation layer and inserted into the lateral receiving opening.

The fastening element may have a fastening means positioned at a greater distance from the rear surface of the cladding panel than the receiving opening, for fastening to a motor vehicle body. The fastening means can be a hook, part of a clip connection, a fastening bolt or the like. The retaining strip holds back the rest of the insulation layer and also the retaining strip cannot be expanded significantly. Thus, the fastening means can be positioned comparatively closely to the lateral receiving opening, without the functionality of the fastening means being impaired by extension of the material of the insulation layer.

The insulation layer may be designed for noise and/or vibration damping and/or for temperature regulation. The insulation layer can have a softness suitable for this purpose and/or a restoring capacity and/or elasticity such that the insulation layer can be particularly flexible and pliable. Even when the insulation layer is of particularly soft design, there is no risk of an impairment of the fastening function of the fastening element by the inserted retaining strip, with the result that no compromises need be made when selecting the material of the insulation layer. Instead, the insulation function of the insulation layer can even be maximized.

The insulation layer may comprise a nonwoven material and/or a foam. In particular, the insulation layer can consist of the nonwoven material or the foam. Since a high extensibility, a high softness and a high flexibility for the insulation layer can be permitted, a good and cost-effective insulation action of the insulation layer can be achieved by a material of this type.

The insulation layer in the region of the opening bears against the fastening element. Thus, a cross-sectional area of the fastening element, running parallel to the rear surface of the cladding panel, decreases from the rear surface of the cladding panel towards a face side of the fastening element. The fastening element can taper towards its free end defined by the face side. The fastening element can be inserted without play into the opening of the insulation layer and with an interference fit. Thus, the area occupied by the insulation layer is not reduced unnecessarily. The fastening element can taper conically so that its cross-sectional area decreases continuously towards the face side. When installing the insulation layer, the opening of the insulation layer can be pushed onto the fastening element in a simple manner and then be aligned automatically on the fastening element, such that the retaining strip is also positioned in a defined relative position with respect to the lateral receiving opening of the fastening element.

The invention is explained below by way of example with reference to the appended drawings and on the basis of preferred exemplary embodiments, wherein the features presented below may in each case individually or in combination represent an aspect of the invention.

DETAILED DESCRIPTION

Figure 1:
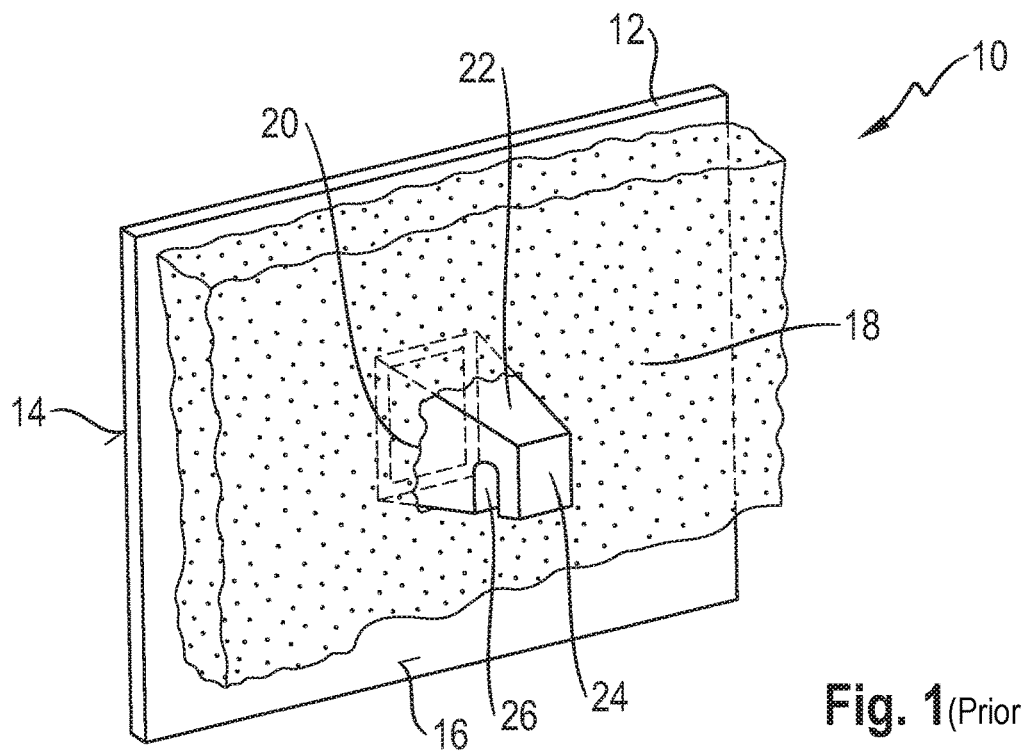
FIG. 1 is a schematic perspective view of a previously known interior trim part according to the prior art.
Figure 2:
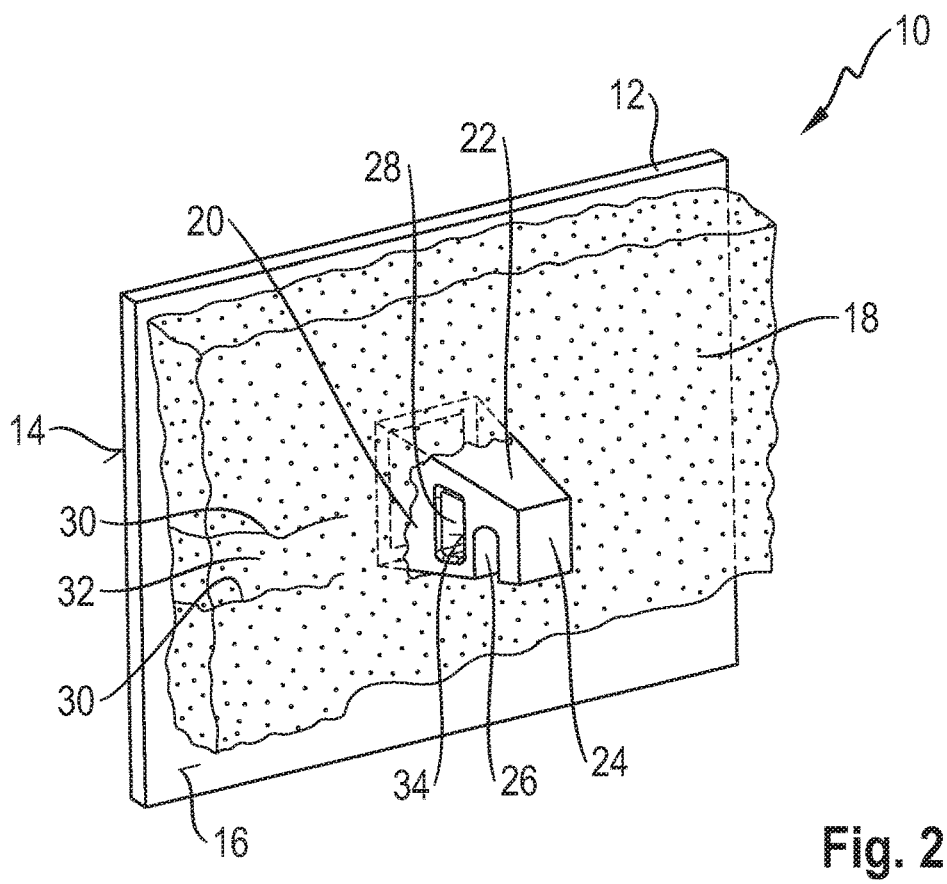
FIG. 2 is a schematic perspective view of an interior trim part according to the invention in a prepared state.

The interior trim part 10 of the invention shown in FIG. 2 has a cladding panel 12 with an inner surface 14 that faces towards a passenger compartment of a motor vehicle. A flexible and pliable insulation layer 18 is fastened, in particular adhesively bonded, to a rear surface 16 that faces away from the inner surface 14. The insulation layer 18 has an opening 20, and a fastening element 22 that protrudes from the rear surface 16 projects through the opening 20. A hook 26 is formed near a face side 24 of the fastening element 22 and at a distance from the insulation layer 18. The hook 26 enables the interior trim part 10 to be fastened to a motor vehicle body. The fastening element 22 has a lateral receiving opening 28.

Figure 3:
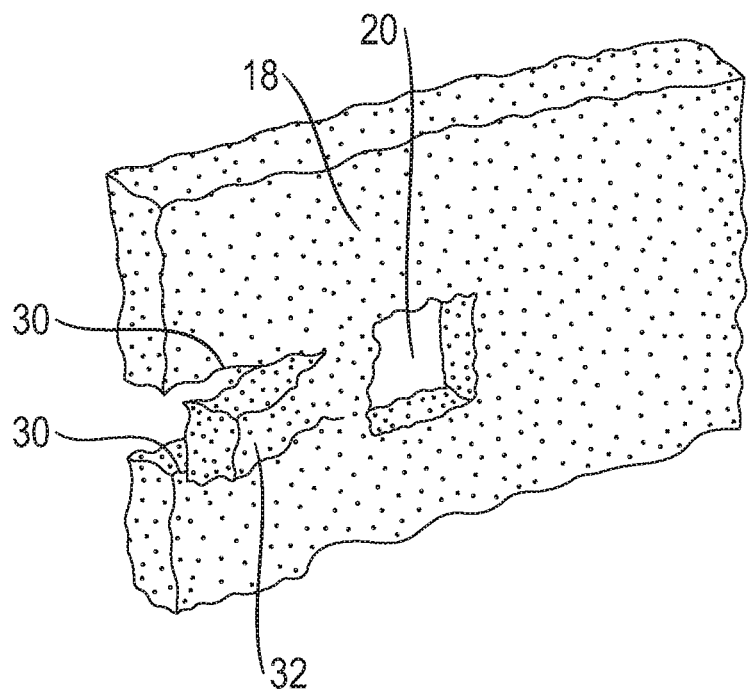
FIG. 3 is a schematic perspective view of an insulation layer of the interior trim part from FIG. 2.
Figure 4:
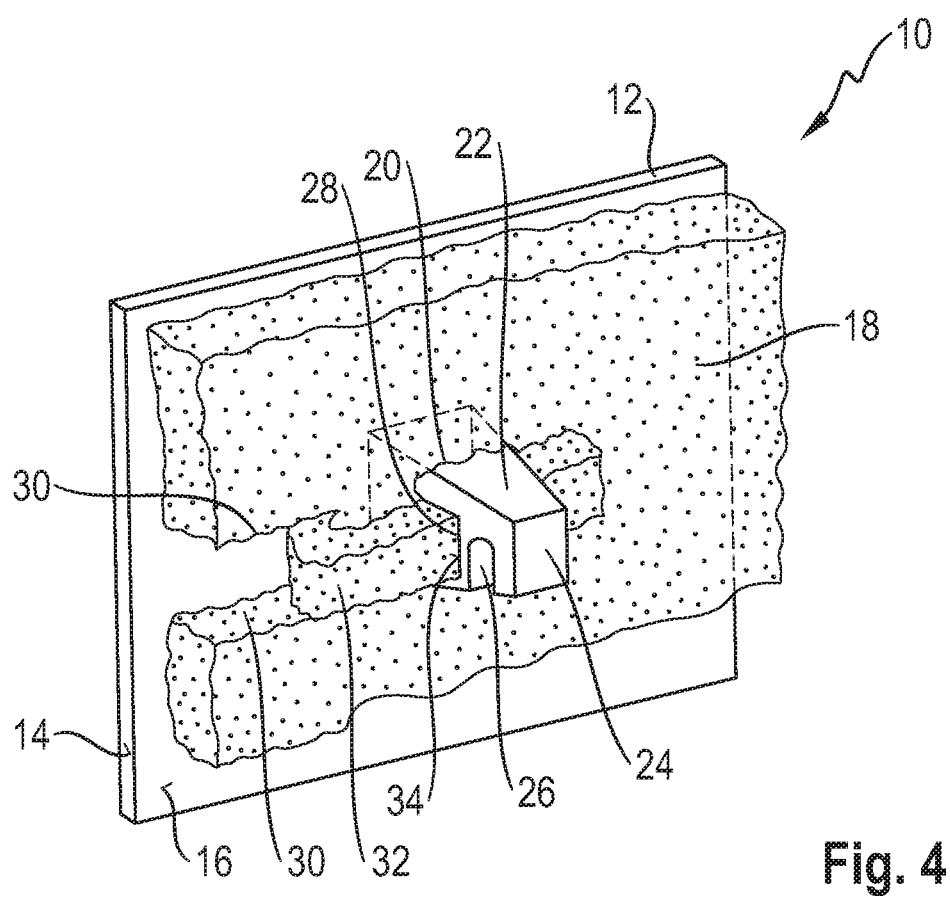
FIG. 4 is a schematic perspective view of the interior trim part from FIG. 2 in a finished state.

As illustrated in FIG. 3, the insulation layer 18 has a retaining strip 32 that is cut out or punched out along two cut edges 30. In contrast to the rest of the insulation layer 18, the retaining strip 32 is not bonded adhesively to the rear surface 16 of the cladding panel 12 and therefore can be bent out from the plane of the insulation layer 18. As illustrated in FIG. 4, the retaining strip 32 can be inserted into the lateral receiving opening 28 and can project out of an opposite further receiving opening 38 of the fastening element 22. The retaining strip 32 is supported on a retaining edge 34 of the receiving openings 28 and can be pressed against the rest of the insulation layer 18. The extended insulation layer 18 can be blocked from covering over the face side 24 of the fastening element 22 by the inserted retaining strip 32, such that the functioning of the fastening means 26 is not impaired.

Figure 5:
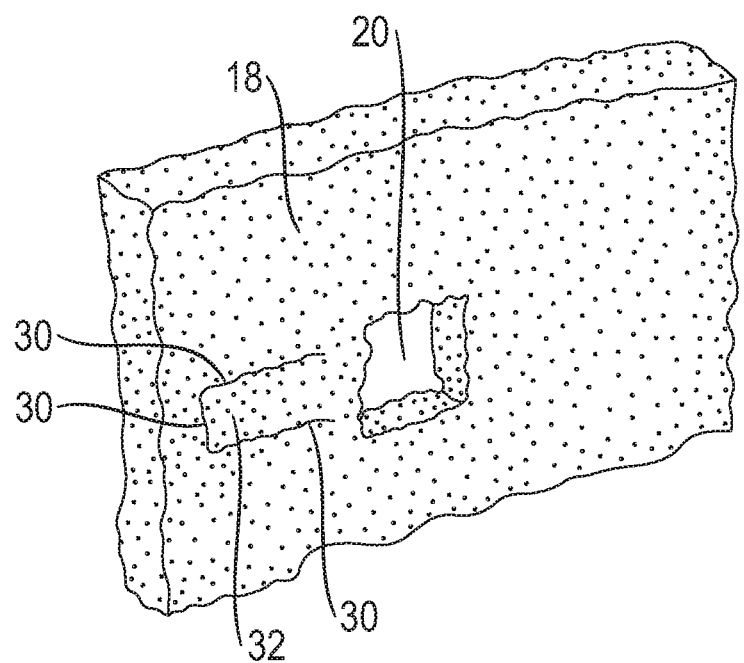
FIG. 5 is a schematic perspective view of an embodiment of the insulation layer as an alternative to the insulation layer from FIG. 3.

The embodiment of the insulation layer 18 shown in FIG. 5 differs from the embodiment of the insulation layer 18 shown in FIG. 3 in that the retaining strip 32 of FIG. 5 is formed by three cut edges 30, such that the retaining strip 32 does not have to extend to the edge of the insulation layer 18. This embodiment can be used for a large-area trim part 10, where the insulation layer 18 covers a large area, while only a short retaining strip 32 is required to provide the blocking function.

Figure 6:
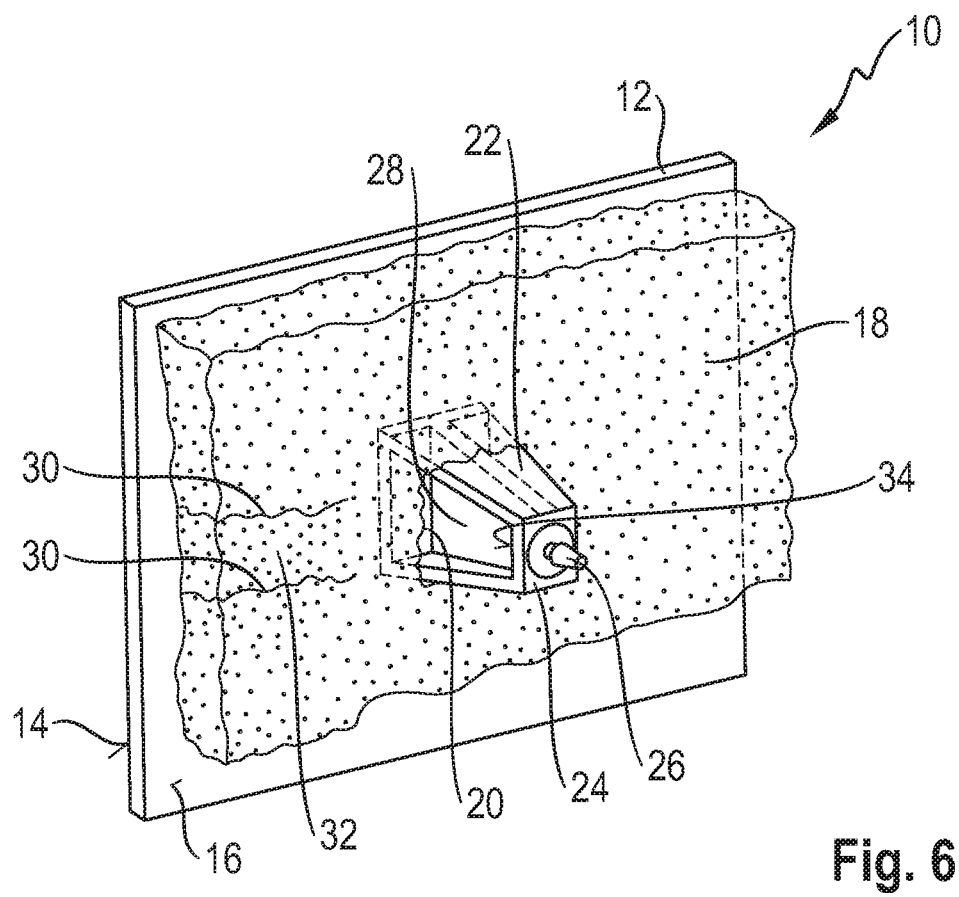
FIG. 6 is a schematic perspective view of an embodiment of the interior trim part as an alternative to the interior trim part from FIG. 2.

The embodiment of the trim part 10 shown in FIG. 6 differs from the embodiment of the trim part 10 shown in FIG. 4 in that the fastening means 26 can also protrude from the face side 24 of the fastening element 22. The fastening means 26 can be formed, for example, as a clippable fastening bolt. Thus, the embodiment of the trim part 10 shown in FIG. 6 enables the retaining edge 34 of the receiving openings 28 to be farther away from the rear surface 16 of the cladding panel 12.

Figure 7:
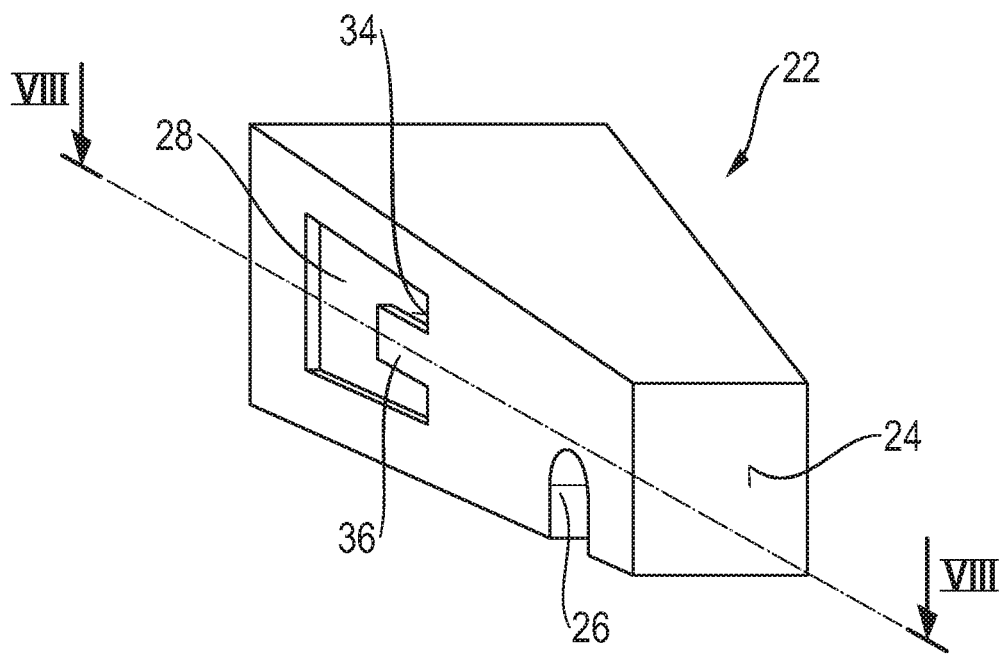
FIG. 7 is a schematic perspective view of an alternative embodiment of a fastening element.
Figure 8:
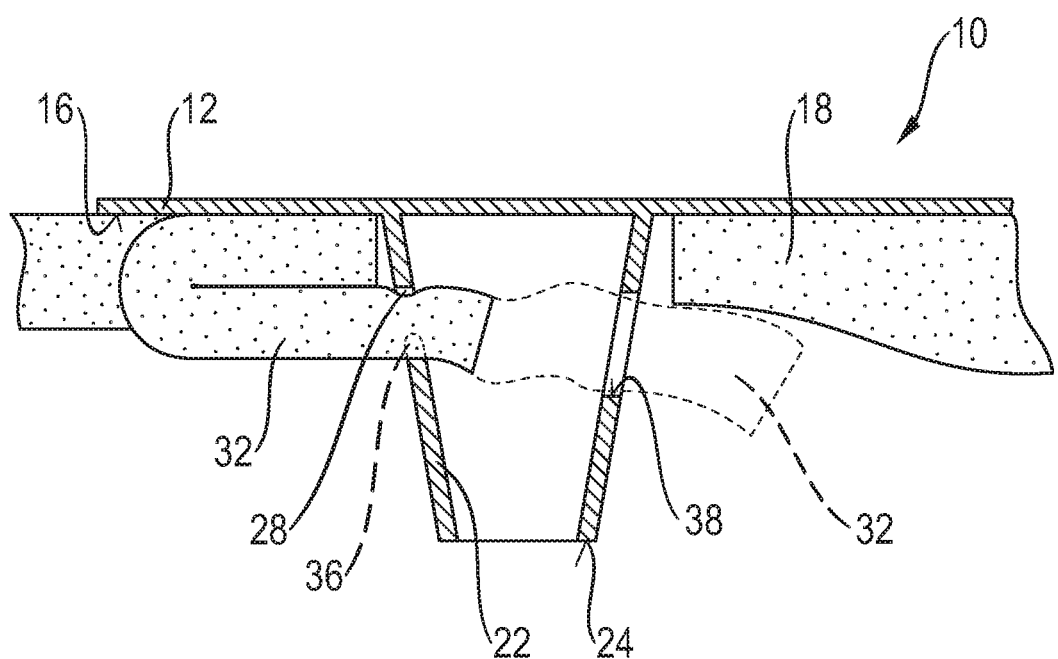
FIG. 8 shows a schematic sectional view of the interior trim part in a finished state along a section line VIII-VIII in FIG. 7.

As illustrated in FIG. 7, the retaining edge 34 of the fastening element 22 can have a tongue 36 projecting into the receiving opening 28. As illustrated in FIG. 8, the tongue 36 can be pressed into the compressible material of the retaining strip 32 such that the retaining strip 32 can be held fixedly, in particular latched, in the receiving opening 28. The receiving opening 28 can be tapered in the region of the tongue 36 so that the retaining strip 32 can be clamped in. Moreover, the tongue 36 can press the retaining strip 32 against the rest of the insulation layer 18. Additionally, or as an alternative, the retaining strip 32 can be guided through a further lateral receiving opening 38 that is opposite the receiving opening 28, of the fastening element 22.

The fastening element 22 can be a hollow truncated cone or pyramid. The fastening element 22 can have trapezoidal side surfaces that are connected to a rectangular or square face side 24 of the fastening element 22. The face side 24 can be a closed planar surface or can have an opening in the face side 24. An opening in the face side 24 can facilitate the threading-in or threading-through of the retaining strip 32 in or through the receiving opening 28 and/or the further receiving opening 38.

What is claimed is:

1. An interior trim part for cladding an inner side of a motor vehicle body, comprising:
    a cladding panel for forming an inner surface that delimits a passenger compartment, and a rear surface opposite the inner surface;
    a flexible insulation layer fastened to the rear surface of the cladding panel, a fastening opening formed through the insulation layer and a retaining strip formed at a position on the insulation layer spaced from the fastening opening;
    a fastening element protruding from the rear surface of the cladding panel and being dimensioned to be inserted through the fastening opening in the insulation layer, the fastening element having a receiving opening spaced rearward from the rear surface of the cladding panel and opening in a direction transverse to a protruding direction of the fastening element from the cladding panel;
    wherein the retaining strip is inserted into the receiving opening in the fastening element to hold the insulation layer against the rear surface of the cladding panel.

2. The interior trim part of claim 1, wherein the retaining strip is bent out in portions from a plane of the insulation layer.

3. The interior trim part of claim 1, wherein the insulation layer has an elastic restoring capacity and is compressible.

4. The interior trim part of claim 1, wherein the receiving opening has a retaining edge that points towards the rear surface, and the retaining strip bears against the retaining edge.

5. The interior trim part of claim 1, wherein the receiving opening has an inner edge that faces away from the rear surface, the inner edge being recessed in the material of the insulation layer.

6. An interior trim part for cladding an inner side of a motor vehicle body, comprising:
    a cladding panel for forming an inner surface that delimits a passenger compartment, and a rear surface opposite the inner surface;
    a flexible insulation layer fastened to the rear surface of the cladding panel, an opening formed through the flexible insulation layer;
    a fastening element protruding from the rear surface of the cladding panel and projecting through the opening of the insulation layer, the fastening element having a lateral receiving opening; and
    a retaining strip integral with the insulation layer and inserted into the receiving opening of the fastening opening, wherein:
    the fastening element has a further receiving opening that is opposite and substantially identically to the receiving opening, the further receiving opening being for pushing the retaining strip through the fastening element.

7. The interior trim part of claim 6, wherein the retaining strip, when pushed through the fastening element, makes contact with the insulation layer outside at least one of the receiving openings.

8. The interior trim part of claim 1, wherein the retaining strip is produced by punching-out or cutting-out from the material of the insulation layer and/or the retaining strip is a constituent part of an outline of the insulation layer.

9. The interior trim part of claim 1, wherein the insulation layer has noise and vibration damping features.

10. The interior trim part of claim 1, wherein the insulation layer comprises a nonwoven material and/or a foam.

11. The interior trim part of claim 1, wherein the insulation layer in the region of the opening bears against the fastening element, wherein a cross-sectional area, running parallel to the rear surface of the cladding panel, of the fastening element decreases from the rear surface of the cladding panel towards a face side of the fastening element.

* * * * *